(12) United States Patent
Takao et al.

(10) Patent No.: US 8,742,772 B2
(45) Date of Patent: Jun. 3, 2014

(54) TOUCH PANEL SENSOR

(71) Applicant: Nitto Denko Corporation, Ibaraki (JP)

(72) Inventors: Hiroyuki Takao, Ibaraki (JP); Naoki Tsuno, Ibaraki (JP); Katsunori Takada, Ibaraki (JP)

(73) Assignee: Nitto Denko Corporation, Ibaraki-shi (JP)

( * ) Notice: Subject to any disclaimer, the term of this patent is extended or adjusted under 35 U.S.C. 154(b) by 0 days.

(21) Appl. No.: 13/653,575

(22) Filed: Oct. 17, 2012

(65) Prior Publication Data

US 2013/0134993 A1 May 30, 2013

(30) Foreign Application Priority Data

Nov. 25, 2011 (JP) ................................. 2011-258032

(51) Int. Cl.
 *G01R 27/28* (2006.01)
(52) U.S. Cl.
 USPC ........... 324/661; 324/658; 324/659; 324/663; 345/173; 345/174; 349/113; 349/118; 349/176
(58) Field of Classification Search
 USPC ................. 324/658–661, 686; 345/173, 174; 349/113, 118, 176, 132; 313/581–587
 See application file for complete search history.

(56) References Cited

U.S. PATENT DOCUMENTS

| | | | |
|---|---|---|---|
| 4,803,402 A * | 2/1989 | Raber et al. .................. 313/509 |
| 7,060,333 B2 | 6/2006 | Takeuchi et al. | |
| 7,559,986 B2 | 7/2009 | Takeuchi et al. | |
| 7,943,210 B2 | 5/2011 | Takeuchi et al. | |
| 8,068,186 B2 | 11/2011 | Aufderheide et al. | |
| 8,237,888 B2 * | 8/2012 | Okuyama et al. ............... 349/65 |
| 2004/0096594 A1* | 5/2004 | Takeuchi et al. ............... 428/1.2 |
| 2004/0125285 A1* | 7/2004 | Arai et al. ..................... 349/113 |
| 2006/0013967 A1* | 1/2006 | Mikoshiba et al. ............ 428/1.1 |

(Continued)

FOREIGN PATENT DOCUMENTS

| JP | 11-053114 A | 2/1999 |
|---|---|---|
| JP | 2002-099388 A | 4/2002 |

(Continued)

OTHER PUBLICATIONS

Japanese Office Action dated Apr. 2, 2013, issued in corresponding Japanese Patent Application No. 2011-258032, with English translation (5 pages).

(Continued)

*Primary Examiner* — Tung X Nguyen
*Assistant Examiner* — Thang Le
(74) *Attorney, Agent, or Firm* — Westerman, Hattori, Daniels & Adrian, LLP

(57) ABSTRACT

A touch panel sensor with which unevenness of interference can be reduced is provided. A touch panel sensor of the present invention includes a film base material, a first transparent electrode pattern formed on a first face of the film base material, a first adhesive layer laminated on the first face of the film base material so as to cover the first transparent electrode pattern, a second transparent electrode pattern formed on a second face of the film base material, and a second adhesive layer laminated on the second face of the film base material so as to cover the second transparent electrode pattern, and the film base material has an in-plane phase difference of $\lambda/4$ with respect to a wavelength $\lambda$ in the visible light region.

7 Claims, 1 Drawing Sheet

(56) References Cited

U.S. PATENT DOCUMENTS

| | | | |
|---|---|---|---|
| 2008/0138589 A1 | 6/2008 | Wakabayashi et al. | |
| 2008/0252614 A1* | 10/2008 | Tatehata et al. | 345/174 |
| 2009/0135151 A1* | 5/2009 | Sun | 345/173 |
| 2010/0225612 A1 | 9/2010 | Ishizaki et al. | |
| 2011/0116010 A1* | 5/2011 | Nagata et al. | 349/62 |
| 2012/0092590 A1* | 4/2012 | Shestak et al. | 349/62 |
| 2012/0094071 A1 | 4/2012 | Itoh et al. | |
| 2012/0313873 A1* | 12/2012 | Bright et al. | 345/173 |

FOREIGN PATENT DOCUMENTS

| | | | |
|---|---|---|---|
| JP | 2003-058320 A | | 2/2003 |
| JP | 2004-045987 A | | 2/2004 |
| JP | 2007-508639 A | | 4/2007 |
| JP | 2008-098169 A | | 4/2008 |
| JP | 2008-262326 A | | 10/2008 |
| JP | 2010-079734 A | | 4/2010 |
| JP | 2010079734 | * | 4/2010 |
| JP | 2010-162746 A | | 7/2010 |
| JP | 2010-231186 A | | 10/2010 |
| JP | 2011-060146 A | | 3/2011 |
| JP | 2011-081810 A | | 4/2011 |
| JP | 2011-194679 A | | 10/2011 |
| JP | 2012-066477 A | | 4/2012 |
| KR | 2011-0049553 A | | 5/2011 |
| TW | 201133514 A1 | | 10/2011 |
| WO | 2010/114056 A1 | | 10/2010 |
| WO | 2011/048648 A1 | | 4/2011 |
| WO | 2011/096580 A1 | | 8/2011 |
| WO | 2011/108494 A1 | | 9/2011 |

OTHER PUBLICATIONS

Korean Office Action dated Oct. 14, 2013, issued in corresponding Korean Patent Application No. 10-2012-0122147 with English translation (11 pages).

Taiwanese Notice of Allowance dated Oct. 24, 2013, issued in corresponding Taiwanese Patent Application No. 101142918 with partial translation (5 pages).

\* cited by examiner

TOUCH PANEL SENSOR

TECHNICAL FIELD

The present invention relates to a touch panel sensor.

BACKGROUND ART

Conventionally, a touch panel sensor in which transparent electrode patterns are formed on both sides of a film base material has been proposed. For example, Patent Literature 1 discloses a touch panel sensor in which two transparent electrode patterns are arranged with a film base material sandwiched therebetween. This configuration has a feature of being able to increase the relative positional accuracy of the two transparent electrode patterns.

CITATION LIST

Patent Literature

Patent Literature 1: JP 2011-60146A

To produce a touch panel sensor, adhesive layers are laminated on transparent electrode patterns formed on both sides of a film base material as described above so that the transparent electrode patterns are embedded in the adhesive layers. However, with this configuration, in a case where external light is incident on the touch panel sensor, reflected light occurs at an interface between the transparent electrode pattern and the adhesive layer on both faces of the film base material. Thus, there is a problem in that the reflected light on both sides of the film base material causes unevenness of interference. The present invention has been made to solve this problem, and it is an object thereof to provide a touch panel sensor with which unevenness of interference can be reduced.

SUMMARY OF INVENTION

A touch panel sensor of the present invention includes a film base material, a first transparent electrode pattern formed on a first face of the film base material, a first adhesive layer laminated on the first face of the film base material so as to cover the first transparent electrode pattern, a second transparent electrode pattern formed on a second face of the film base material, and a second adhesive layer laminated on the second face of the film base material so as to cover the second transparent electrode pattern, wherein the film base material has an in-plane phase difference of $\lambda/4$ with respect to a wavelength $\lambda$ in a visible light region.

When a transparent electrode pattern and an adhesive layer covering this pattern are formed on both faces of the film base material, when external light is incident on the touch panel sensor, reflected light occurs at an interface between the transparent electrode pattern and the adhesive layer on each face of the film base material. At this time, if there is a difference between the refractive index of the transparent electrode pattern and the refractive index of the adhesive layer, there is a risk that unevenness of interference may occur due to two types of reflected light. In contrast, in the present invention, since the film base material has an in-plane phase difference of $\lambda/4$ with respect to a wavelength $\lambda$ in the visible light region, the phase of the reflected light that has occurred at the interface between the first transparent electrode pattern and the first adhesive layer on the first face of the film base material and the phase of the reflected light that has occurred at the interface between the second transparent electrode pattern and the second adhesive layer on the second face can be allowed to cancel each other. Consequently, the unevenness of interference due to the above-described two types of reflected light can be reduced.

In the above-described touch panel sensor, it is possible to fulfill $n_{e1}-n_{a1} \geq 0.3$ and $n_{e2}-n_{a2} \geq 0.3$, where $n_{e1}$ is the refractive index of the first transparent electrode pattern, $n_{e2}$ is the refractive index of the second transparent electrode pattern, $n_{a1}$ is the refractive index of the first adhesive layer, and $n_{a2}$ is the refractive index of the second adhesive layer. In this manner, even in cases where there are large differences between refractive indices, the use of the above-described film base material can reduce unevenness of interference.

Moreover, it is possible to set each of the refractive index $n_{e1}$ of the first transparent electrode pattern and the refractive index $n_{e2}$ of the second transparent electrode pattern at 1.9 to 2.5. For example, each of the first transparent electrode pattern and the second transparent electrode pattern can be formed of indium tin oxide, indium zinc oxide, or a composite oxide of indium oxide and zinc oxide.

On the other hand, it is possible to set each of the refractive index $n_{a1}$ of the first adhesive layer and the refractive index $n_{a2}$ of the second adhesive layer at 1.4 to 1.6. For example, a pressure-sensitive adhesive formed of an acrylic adhesive can be used as the first adhesive layer and the second adhesive layer.

The above-described film base material can be produced by various methods, and, for example, the film base material can be formed by drawing a film formed of a material selected from polyethylene terephthalate, polycycloolefin, or polycarbonate in one direction.

With the touch panel sensor according to the present invention, unevenness of interference can be reduced.

REFERENCE SIGNS LIST 1 film base material
11 first transparent electrode pattern
12 second transparent electrode pattern
21 first adhesive layer
22 second adhesive layer

DESCRIPTION OF EMBODIMENT

Figure 1:
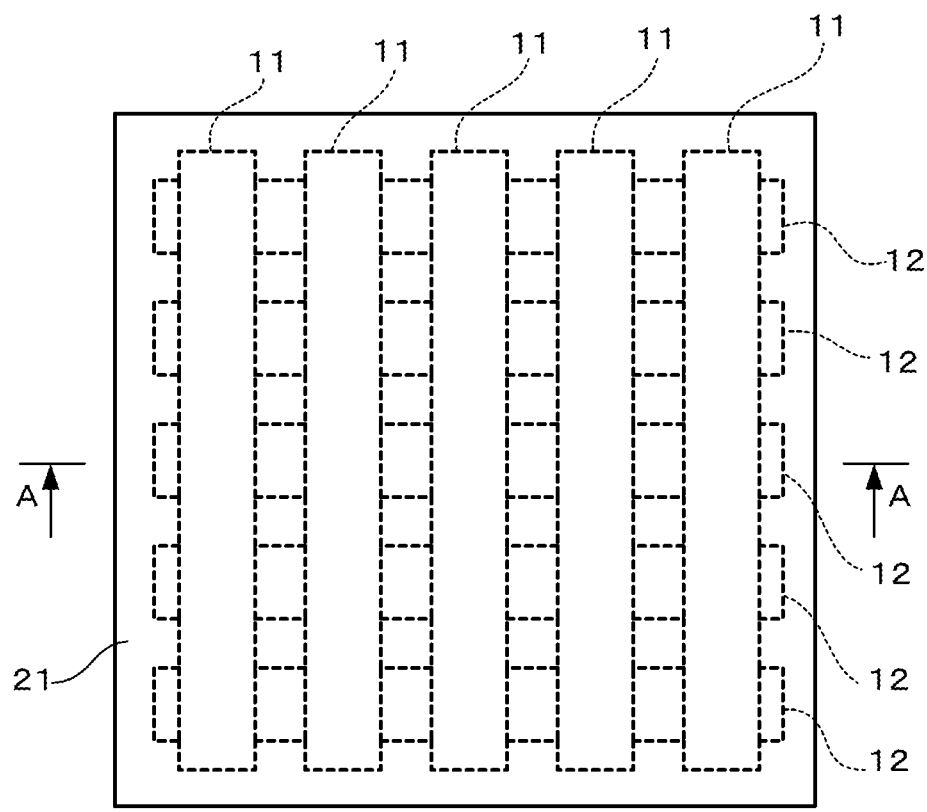
FIG. 1 is a plan view of a touch panel sensor according to an embodiment of the present invention.
Figure 2:
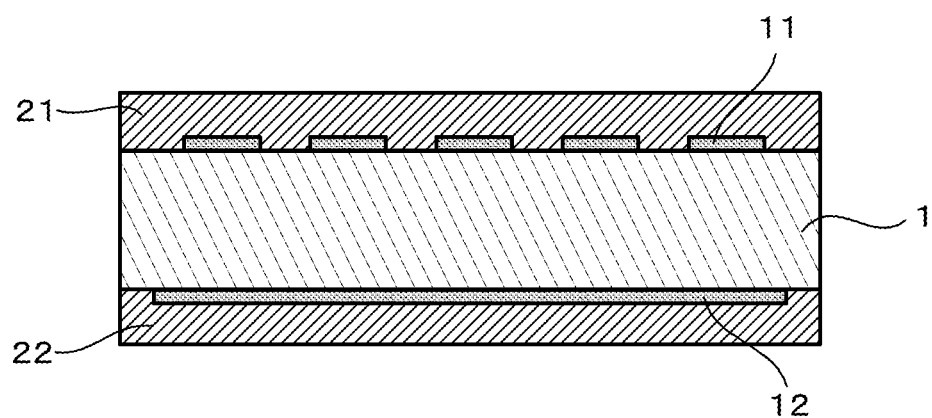
FIG. 2 is a cross-sectional view taken along line A-A in FIG. 1.

Hereinafter, an embodiment of a touch panel sensor according to the present invention will be described with reference to the drawings. FIG. 1 is a plan view of this touch panel sensor, and FIG. 2 is a cross-sectional view taken along line A-A in FIG. 1. In the following description, the upper side in FIG. 1 is regarded as the "top" and the lower side is regarded as the "bottom" for convenience of description, but the position, orientation, and the like in which each member is disposed are not limited to this.

The touch panel sensor according to this embodiment is a sensor for use in a capacitive touch panel, and in this sensor, as shown in FIGS. 1 and 2, transparent electrode patterns 11 and 12 are formed on respective faces of a film base material 1. Specifically, the striped, first transparent electrode pattern 11 is formed on an upper face (first face) of the film base material 1, and a first adhesive layer 21 is laminated on the upper face of the film base material 1 so that the first transparent electrode pattern 11 is embedded therein. On the other hand, the striped, second transparent electrode pattern 12 intersecting the first transparent electrode pattern 11 is formed on a lower face (second face) of the film base material 1, and a second adhesive layer 22 is laminated on the lower face of the film base material 1 so that the second transparent electrode pattern 12 is embedded therein. Although not shown in the drawings, for example, a cover lens serving as a protective layer can be disposed on the upper face of the first adhesive layer 21, if necessary. The cover lens is disposed on the uppermost surface of the touch panel sensor and used to protect the touch panel sensor against an external impact and friction. Examples of the material for forming the cover lens include plastic and glass, and the thickness of the cover lens can be set at, for example, 0.5 to 1.5 mm.

The touch panel sensor having the above-described configuration is used in the following manner. Touching any position on the cover lens with a finger causes a change in the capacitance between the first transparent electrode pattern 11 and the second transparent electrode pattern 12 at that position. That is to say, the capacitance at corresponding stripes of the first pattern and the second pattern changes, so that the intersection of those stripes at which the capacitance has changed can be calculated as the touched position.

In the above-described touch panel sensor, the film base material 1 has an in-plane phase difference of $\lambda/4$ with respect to a wavelength $\lambda$ in the visible light region. Thus, unevenness of interference that will occur when external light is incident on the touch panel sensor can be reduced. That is to say, when the transparent electrode patterns 11 and 12 and the adhesive layers 21 and 22 covering these patterns are formed on the respective faces of the film base material 1 as described above, on each face of the film base material 1, reflected light occurs at an interface between the adhesive layer 21 or 22 and the transparent electrode pattern 11 or 12. At this time, if there is a large difference between the refractive index of the transparent electrode pattern and the refractive index of the adhesive layer, there is a risk that unevenness of interference may be caused by the two types of reflected light. In contrast, when the film base material 1 as described above is used, the phase of the reflected light that has occurred at the interface between the first adhesive layer 21 and the first transparent electrode pattern 11 on the upper face of the film base material 1 and the phase of the reflected light that has occurred at the interface between the second adhesive layer 22 and the second transparent electrode pattern 12 on the lower face are allowed to cancel each other. Consequently, the unevenness of interference due to the above-described two types of reflected light can be reduced.

In particular, with this touch panel sensor, since, as will be described later, minimum values of the refractive index $n_{e1}$ of the first transparent electrode pattern 11 and the refractive index $n_{e2}$ of the second transparent electrode pattern 12 are 1.9 and maximum values of the refractive index $n_{a1}$ of the first adhesive layer 21 and the refractive index $n_{a2}$ of the second adhesive layer 22 are 1.6, the differences between the refractive indices of the transparent electrode patterns 11 and 12 and the refractive indices of the corresponding adhesive layers 21 and 22 are at least 0.3 and fulfill a relationship of $n_{e1}-n_{a1} \geq 0.3$ and $n_{e2}-n_{a2} \geq 0.3$. Therefore, both of the differences in refractive index are large, but even when there are large differences in refractive index as described above, the use of the above-described film base material 1 can reduce the unevenness of interference.

Next, the individual layers constituting the above-described touch panel sensor will be described.

(1) Film Base Material

The aforementioned film base material 1 supports the above-described first and second transparent electrode patterns 11 and 12. The thickness of the film base material 1 can be set at, for example, 20 to 200 μm. Moreover, although the film base material 1 can be formed of various materials, it is preferable to use, for example, polyethylene terephthalate, polycycloolefin, polycarbonate, or the like. Moreover, the film base material 1 may have on its surface, for example, an easily adhesive layer for improving adhesion with the transparent electrode patterns 11 and 12, a refractive index adjusting layer (index-matching layer) for adjusting the refractive index of the film base material 1, or a hard coat layer for protecting the surface of the film base material 1 to prevent a scratch from being made.

The film base material 1 has an in-plane phase difference of $\lambda/4$ with respect to a wavelength $\lambda$ in the visible light region (wavelength of 380 to 780 nm). For example, at a wavelength of 600 nm, the film base material 1 has an in-plane phase difference of 150 nm (=600/4). "In-plane phase difference" refers to a phase difference that is caused by the difference between the refractive indices in two orthogonal directions within a plane parallel to the principal plane of the film base material 1 (a refractive index $n_x$ in a slow axis direction and a refractive index $n_y$ in a fast axis direction). The in-plane phase difference such as that of the film base material 1 can be adjusted as appropriate by drawing the aforementioned film material in one direction. It should be noted that the in-plane phase difference is not necessarily required to be exactly $\lambda/4$ with respect to the wavelength $\lambda$ and can be increased/decreased as appropriate so that the aforementioned effect of reducing unevenness of interference can be obtained.

(2) Transparent Electrode Pattern

The aforementioned first and second transparent electrode patterns 11 and 12 are sensors for detecting a touched position. Usually, each of the transparent electrode patterns 11 and 12 is electrically connected to wiring (not shown) arranged at an end portion of the film, and the wiring is connected to a controller IC (not shown). The first and second transparent electrode patterns 11 and 12 as described above can be, for example, as shown in FIG. 1, arranged in a grid-like manner with either one of these patterns serving as electrodes for x-coordinates and the other serving as electrodes for y-coordinates. In this case, for example, the height, width, and pitch of each of the transparent electrode patterns 11 and 12 can be set at 10 to 100 nm, 0.1 to 5 mm, and 0.5 to 10 mm, respectively. Moreover, the shape of each of the transparent electrode patterns 11 and 12 can also be any shape such as a rhombic shape, as well as the striped shape.

Moreover, the transparent electrode patterns 11 and 12 are typically formed of a transparent conductor. The transparent conductor is a material having a high transmittance (80% or more) in the visible light region (380 to 780 nm) and having a surface resistance value per unit area ($\Omega/\square$: ohms per square) of 500$\Omega/\square$ or less. Furthermore, it is preferable that the refractive index $n_{e1}$ of the first transparent electrode pattern 11 and the refractive index $n_{e2}$ of the second transparent electrode pattern 12 are each 1.9 to 2.5. To obtain the transparent electrode pattern 11 and 12 having such properties, for example, indium tin oxide (2.1), indium zinc oxide (2.3), or a composite oxide of indium oxide and zinc oxide (2.1 to 2.3) can be used. It should be noted that the numerical values in parentheses indicate the refractive indices of these materials with respect to light at a wavelength of 589.3 nm (the sodium D-line). The transparent electrode patterns 11 and 12 can be formed by various methods. For example, the following method can be used. First, a transparent conductor layer made of the above-described material is formed on the film base material 1 by sputtering or vacuum deposition. Then, the formed transparent conductor layer is patterned by an etching process, and thus a transparent electrode pattern is formed. Moreover, a transparent conductor layer having a surface resistance value as described above can be obtained by, for example, forming an indium tin oxide film containing 97 wt % of indium oxide and 3 wt % of tin oxide on a predetermined film and heating the resultant indium tin oxide layer to crystallize this layer.

(3) Adhesive Layer

The aforementioned first and second adhesive layers 21 and 22 are, as described above, layers in which the transparent electrode patterns 11 and 12 are embedded, and a pressure-sensitive adhesive (also referred to as "adhesive") can be used. Preferably, for example, an acrylic adhesive is used as the pressure-sensitive adhesive. Moreover, an adhesive appropriately selected from commercially available optical clear adhesives (OPAs) can also be used. Preferably, the thickness of the first and second adhesive layers 21 and 22 is, for example, 10 to 80 μm. Moreover, preferably, the refractive index $n_{a1}$ of the first adhesive layer 21 and the refractive index $n_{a2}$ of the second adhesive layer 22 are each 1.4 to 1.6.

(4) Manufacturing Method

Next, an example of the method of manufacturing the aforementioned touch panel sensor will be described. First, the aforementioned transparent conductor layer is formed on the upper face of the film base material 1. Similarly, a transparent conductor layer is formed on the lower face of the film base material 1. Then, this film base material 1 is heated to crystallize the transparent conductor layers. Subsequently, the transparent conductor layers are patterned by etching to form the first and second transparent electrode patterns 11 and 12. Here, when one of the transparent conductor layers is patterned, a protective film or the like is laminated on the other transparent conductor layer beforehand in order to protect the other transparent conductor layer. Subsequently, the adhesive layers 21 and 22 are laminated on the respective faces of the film base material 1 so that the transparent electrode patterns 11 and 12 are embedded therein. The thus completed touch panel sensor can be applied to various applications and used in, for example, smartphones, tablet terminals (also referred to as "Slate PCs"), and the like.

Although an embodiment of the present invention has been described above, the present invention is not limited to the above embodiment, and various changes can be made without departing from the gist of the present invention.

EXAMPLE

Hereinafter, an example of the present invention will be described. However, the present invention is not limited to the example below. In the following description, an example according to a touch panel sensor having the form of the above embodiment and a comparative example for comparison with this example were produced.

(1) Example

A polycycloolefin film having a thickness of 100 μm (manufactured by Zeon Corporation, trade name "ZEONOR (registered trademark)") was drawn in one direction so that the in-plane phase difference at a wavelength of 560 nm was 140 nm to produce a film base material. At this time, the in-plane phase difference was measured using a spectroscopic ellipsometer (manufactured by JASCO Corporation, product name "M-220"). Then, a sputtering system equipped with a sintered target containing 97 wt % of indium oxide and 3 wt % of tin oxide was provided. Subsequently, an indium tin oxide layer having a thickness of 27 nm was formed on one face of the film base material using the above-described sputtering system. Also, an indium tin oxide layer having a thickness of 27 nm was formed in the same manner on the other face of the film base material. The film base material with the indium tin oxide layers thus formed on both faces thereof was placed in a heating oven and heated at 140° C. for 30 minutes to crystallize the amorphous indium tin oxide layers. When the surface resistance value of the resultant indium tin oxide layers was measured using a four-terminal method, the indium tin oxide layers had a surface resistance value of 270Ω/□ and exhibited excellent electrical conductivity. Moreover, each indium tin oxide layer had a refractive index of 2.1.

Next, a polyester film as a protective layer (manufactured by Sun A. Kaken Co., Ltd.) was laminated on one of the indium tin oxide layers to protect this indium tin oxide layer, and the other indium tin oxide layer was thereafter patterned. That is to say, a photoresist with a pattern of stripes was formed on the surface of the indium tin oxide layer and then immersed in hydrochloric acid to perform an etching process. This was followed by drying at 120° C. for 5 minutes, and thus a striped, first transparent electrode pattern having a height of 27 nm, a width of 2 mm, and a pitch of 6 mm was formed. Subsequently, the protective layer was removed, the first transparent electrode pattern was thereafter protected by a protective layer, and patterning was performed in the same manner as described above to form a second transparent electrode pattern.

Finally, first and second adhesive layers having a thickness of 25 μm (manufactured by Nitto Denko Corporation, trade name "LUCIACS (registered trademark)") were laminated on the respective faces of the film base material so that the transparent electrode patterns were embedded in the respective adhesive layers. Each adhesive layer had a refractive index of 1.5. Thus, a touch panel sensor of the example was completed. The difference between the refractive index $n_{e1}$ of the first transparent electrode pattern and the refractive index $n_{a1}$ of the first adhesive layer and the difference between the refractive index $n_{e2}$ of the second transparent electrode pattern and the refractive index $n_{a2}$ of the second adhesive layer were each 0.6 (=2.1−1.5). It should be noted that the film thickness of the above-described various members was measured using a film thickness meter (manufactured by Ozaki Mfg. Co., Ltd., a digital dial gauge DG-205).

(2) Comparative Example

A polycycloolefin film as described above was provided and used as a film base material without being drawn. Otherwise, the same procedure as in the above example was performed.

(3) Checking for Unevenness of Interference

The touch panel sensors of the above example and comparative example were visually inspected to check for unevenness of interference. At this time, each touch panel sensor was illuminated from above with a three band fluorescent lamp and visually inspected from an oblique direction, and unevenness of interference was not confirmed in the example, whereas unevenness of interference was confirmed in the comparative example. That is to say, it was found that in the example, even though there was a large difference in refractive index between the transparent electrode pattern and the adhesive layer on each face of the film base material, unevenness of interference did not occur.

The invention claimed is:

1. A touch panel sensor comprising:
a film base material;
a first transparent electrode pattern formed on a first face of the film base material;
a first adhesive layer laminated on the first face of the film base material so as to cover the first transparent electrode pattern;
a second transparent electrode pattern formed on a second face of the film base material; and
a second adhesive layer laminated on the second face of the film base material so as to cover the second transparent electrode pattern,
wherein the film base material has an in-plane phase difference of $\lambda/4$ with respect to a wavelength $\lambda$ in a visible light region, and
$n_{e1}-n_{a1} \geq 0.3$ and $n_{e2}-n_{a2} \geq 0.3$, where $n_{e1}$ is a refractive index of the first transparent electrode pattern, $n_{e2}$ is a refractive index of the second transparent electrode pattern, $n_{a1}$ is a refractive index of the first adhesive layer, and $n_{a2}$ is a refractive index of the second adhesive layer.

2. The touch panel sensor according to claim 1, wherein the refractive index $n_{e1}$ of the first transparent electrode pattern and the refractive index $n_{e2}$ of the second transparent electrode pattern are each 1.9 to 2.5.

3. The touch panel sensor according to claim 1, wherein each of the first transparent electrode pattern and the second transparent electrode pattern is formed of indium tin oxide, indium zinc oxide, or a composite oxide of indium oxide and zinc oxide.

4. The touch panel sensor according to claim 1, wherein the refractive index $n_{a1}$ of the first adhesive layer and the refractive index $n_{a2}$ of the second adhesive layer are each 1.4 to 1.6.

5. The touch panel sensor according to claim 1, wherein the first adhesive layer and the second adhesive layer are pressure-sensitive adhesives formed of an acrylic adhesive.

6. The touch panel sensor according to claim 1, wherein the film base material is formed by drawing a film formed of a material selected from polyethylene terephthalate, polycycloolefin, or polycarbonate in one direction.

7. The touch panel sensor according to claim 1, wherein the film base material is formed by drawing a polycycloolefin film in one direction.

* * * * *